3,026,361
PRODUCTION OF CHLOROFORM
Harold M. Pitt, Lafayette, and Harry Bender, El Cerrito, Calif., assignors to Stauffer Chemical Company, a corporation of Delaware
No Drawing. Filed Mar. 23, 1960, Ser. No. 16,945
11 Claims. (Cl. 260—658)

This invention relates in general to a hydrogen exchange reaction and more particularly to a vapor phase reaction between carbon tetrachloride and certain hydrocarbons and chlorinated hydrocarbons so as to reduce the carbon tetrachloride to chloroform and to chlorinate the reducing agent.

Carbon tetrachloride and carbon tetrabromide have been reacted with various saturated hydrocarbons containing more than two carbon atoms to yield chloroform and additional chlorinated hydrocarbons. See U.S. Patents 2,553,799 and 2,914,572. These processes require catalysts and extended reaction times. It is also known to pass carbon tetrachloride and various alkanes or alkyl chlorides through a reactor having an added surface material (carbon, pumice, etc.) to reform the carbon tetrachloride to perchlorethylene. The alkane or alkyl chloride is regarded as "a chlorine acceptor" and serves to shift the equilibrium involved to insure a more complete conversion of the carbon tetrachloride. However, no chloroform is prepared through this process; see French Patent 902,769 to Donau.

It is an object of this invention to enable an exchange reaction of the type described above which may be carried out under relatively mild reaction conditions without a catalyst and using extremely short reaction periods, thus to enable the utilization of a flow system.

In general, the process of this invention comprises heating carbon tetrachloride to a temperature of between about 400° C. and 650° C. and preferably between about 450° C. and 650° C. for a period of between about 0.1 and 20 seconds and preferably between 1 and 5 seconds in the presence of any one of various partially chlorinated alkanes or non-chlorinated alkanes (at least two carbon atoms). The hydrocarbons which may be used are of relatively low molecular weight, all having less than four carbon atoms, thus making possible a vapor phase process even at relatively mild reaction temperatures. Methane is expressly excluded from the foregoing since this hydrocarbon is especially unreactive with carbon tetrachloride and reacts in an atypical fashion to yield reaction products differing from the products secured from the process variants of this invention. The contact or residence times are very brief, as noted, and this is in part due to the fact that the reaction is carried out in the vapor phase where most previously known processes were carried out in the liquid phase and hence required longer contact times.

In one process variant, methyl chloride reacts with carbon tetrachloride to produce methylene chloride and chloroform, the operative temperature range being 400° C. to 650° C. and a preferred temperature range being about 490° C. to 575° C. and the contact time being between about 0.1 to 20 seconds.

In a second process variant, ethyl chloride reacts with carbon tetrachloride at a temperature generally within the range 400° C. and 650° C. and preferably within the range 480° C. to 590° C. for a period of 0.1 to 20 seconds to produce chloroform and ethylidene chloride, $CH_3CHCl_2$. Within the limits of the accuracy of the Beckman GC–2, gas chromatograph, no ethylene dichloride is obtained.

In still another process variant, ethane and carbon tetrachloride are reacted at a temperature within the range 400° C. to 650° C. and preferably within the range 450° C. to 610° C. for a period of 0.1 to 20 seconds to yield chloroform and ethyl chloride.

In a fourth process variant, carbon tetrachloride and propane are reacted for 0.1 to 20 seconds at a temperature within the range 400° C. to 650° C. and preferably within the range 475° C. to 530° C. to yield chloroform and a propyl chloride. Lower temperatures, as between about 475° C. and 500° C., yield both monochloropropanes (1-chloropropane and 2-chloropropane) which may be recovered as such, while at higher temperatures, within the range 500° C. to 530° C., extensive cracking of the products to yield quantities of propylene and HCl results.

In a fifth process variant, methylene chloride reacts with carbon tetrachloride at a temperature of between about 400° C. and 650° C. and preferably between about 450° C. and 580° C. to yield chloroform as substantially the sole reaction product. The residence times are preferably between about 0.1 and 20 seconds.

Study of the reactions described above has shown that where the temperature is sufficiently high to result in a marked loosening of the C–Cl bond in the carbon tetrachloride, a greater directional effect is secured than is achieved by the use of chlorine itself.

Considerable variation of time and temperature within the limits set forth is possible, higher temperatures requiring shorter contact times and lower temperatures requiring longer contact times.

Of all the embodiments set forth above, highest conversions per pass were obtained with ethane at retention times of approximately two seconds. The mechanism for this reaction appears to be:

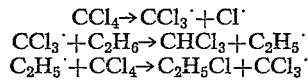

Feeding a small amount of chlorine to the reactor produced ethyl radical so that the mechanism becomes:

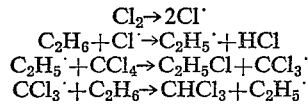

In this way, conversions per pass of carbon tetrachloride to chloroform reached 33 percent, although it would probably be more advantageous to run with a conversion per pass of 18 percent where yields appear to be well over 95 percent and the produced ethyl chloride is not appreciably chlorinated to ethylidene chloride.

It should be pointed out that an excess of the second reactant, more than one mol hydrocarbon or chlorinated hydrocarbon per mol carbon tetrachloride, is desirable in all process variants as a stabilizer for the chloroform. The normal thermal decomposition of chloroform, which is exceedingly rapid at the temperatures used, involves a free radical chain reaction more or less as shown in the following scheme:

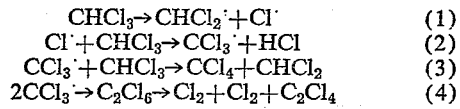

The excess of second reactant prevents Reactions 2 and 3 by reacting preferentially with the Cl· and CCl₃·.

With respect to the reaction of carbon tetrachloride and methyl chloride, at lower temperatures with lower conversions, the methyl chloride reacts to produce more moles of methylene chloride than chloroform. At higher temperatures and higher conversions, this is not so. It seems evident that the following mechanism is one reaction path in the interaction of methyl chloride and carbon tetrachloride:

$$CH_3Cl + CCl_3\cdot \rightarrow CH_2Cl_2 + CHCl_2\cdot$$
$$CHCl_2\cdot + CH_3Cl \rightarrow CH_2Cl_2 + CH_2Cl\cdot$$
$$CH_2Cl\cdot + CCl_4 \rightarrow CH_2Cl_2 + CCl_3\cdot$$

This reaction would allow considerable latitude in ratio of products from the reaction of methyl chloride and carbon tetrachloride. It might be mentioned here that in the reaction of carbon tetrachloride with ethane, ethyl chloride and propane, by-product methylene chloride appears long before the concentration of carbon tetrachloride has been materially reduced.

Although the thermal reaction of ethyl chloride and chlorine leads to a product ratio of 4 to 1 of ethylidene chloride to ethylene dichloride, the reaction of carbon tetrachloride and ethyl chloride leads to as close to 100% ethylidene chloride as can be determined by the gas chromatograph. Further chlorination of ethylidene chloride by chlorine again leads to a product ratio of 4 to 1 of methyl chloroform to 1,1,2-trichloroethane. But with carbon tetrachloride, again, the product is 100% methyl chloroform with no 1,1,2-trichloroethane (although this appears as vinylidene chloride).

In a series of tests using 60 cc. and 420 cc. Vycor tubes, the carbon tetrachloride and the second reactant were metered, the carbon tetrachloride vaporized and the two gases mixed just before being allowed to enter the reactor. Analysis of the product was made by a Beckman GC-2 gas chromatograph. Details are set forth in the examples below; these are included for illustrative purposes only and are not to be interpreted as imposing limitations on the scope of the invention other than as set forth in the appended claims.

In each of the examples, it was found that for each mol chloroform formed, an additional mol of chlorinated hydrocarbon was formed.

*Example 1a*

60 cc. Vycor reactor; feed was .006 mol/min. $CCl_4$ and .0187 mol/min. $C_2H_6$. The results are given as mol percent $CHCl_3$ and $C_2Cl_4$ (based on the $CCl_4$ feed) in the recovered liquids from the reactor, the remainder being substantially entirely ethyl chloride. The vinyl, vinylidine and ethylidene chlorides formed represented less than 1% of the ethyl chlorides formed.

| Temperature, °C. | Mol Percent $CHCl_3$ | Mol Percent $C_2Cl_4$ |
| --- | --- | --- |
| 542 | 5.6 | .1 |
| 567 | 9.27 | .1 |
| 575 | 12.4 | .15 |
| 580 | 14.0 | .4 |
| 587 | 18.0 | .6 |
| 602 | 26.0 | 1.46 |
| 610 | 33.4 | 2.14 |

*Example 1b*

420 cc. Vycor reactor; feed was .013 mol/min. $CCl_4$ and .013 mol/min. $C_2H_6$. Results are given as in Example 1a, the remaining fraction of the product being substantially ethyl chlorides.

| Temperature, °C. | Mol Percent $CHCl_3$ | Mol Percent $C_2Cl_4$ |
| --- | --- | --- |
| 540 | 3.5 | .1 |
| 550 | 4.75 | |
| 560 | 6.6 | |
| 565 | 7.75 | |
| 578 | 13.2 | .6 |
| 585 | 13.75 | 1.0 |
|  |  | 1.1 |

*Example 2a*

420 cc. Vycor reactor through which .0108 mol/min. $CCl_4$ and .0218 mol/min. methylene chloride are passed; at a temperature of 450° C. the product contained 2.2 mol percent chloroform and no perchlorethylene.

*Example 2b*

With a feed of .015 mol/min. $CCl_4$ and .015 mol/min. methylene chloride at a temperature of 450° C. the product contained 1.83 mol percent of chloroform and no perchlorethylene.

*Example 2c*

At the same temperature as in 2b, with a feed of .0075 mol/min. $CCl_4$ and .0075 mol/min. methylene chloride, the product contained 5.1 mol percent chloroform and no perchlorethylene.

*Example 2d*

With a 60 cc. Vycor reactor at a temperature of 580° C. and a feed of .012 mol/min. $CCl_4$ and .012 mol/min. methylene chloride, the product contained 5.2 mol percent chloroform and .3 mol percent perchlorethylene.

*Example 3a*

60 cc. Vycor reactor at a temperature of 590° C.; feed was .0058 mol/min. ethyl chloride and .0058 mol/min. $CCl_4$. The product was analyzed and it was found that 9.0 mol percent of the $CCl_4$ had been converted to chloroform. An equivalent quantity of ethylidene chloride had been formed, part of which had been cracked to vinyl chloride and a trace further chlorinated to vinylidine chloride.

*Example 3b*

With the same reactor and a temperature of 540° C. and a feed of .0029 mol/min. $CCl_4$ and .0029 mol/min. ethyl chloride, 8.75 mol percent of the $CCl_4$ was converted to chloroform with the production of an equivalent number of mols of ethylidene chloride, a small part of which had cracked to vinyl chloride and a trace further chlorinated to vinylidine chloride.

*Example 4a*

Using a 420 cc. tubular Vycor reactor at a temperature of 490° C.; feed was .012 mol/min. $CCl_4$ and .066 mol/min. methyl chloride. The liquid product contained 4.5 mol percent chloroform and 4.5 mol percent methylene chloride. No other products were found.

*Example 4b*

Using a 60 cc. Vycor reactor at a temperature of 575° C.; feed was .005 mol/min. $CCl_4$ and .0083 mol/min. methyl chloride. The product was found to contain 5.45 mol percent methylene chloride and 3.75 mol percent chloroform, along with .7 mol percent trichlorethylene.

*Example 5a*

Using a 60 cc. Vycor reactor and a feed of .012 mol/min. $CCl_4$ and .0146 mol/min. propane; the carbon tetrachloride was converted to chloroform in the following percentages at the following temperatures:

| Temperature: | Mol percent $CCl_4$ to chloroform |
| --- | --- |
| 475° C. | 2.6 |
| 490 | 3.4 |
| 505 | 6.6 |
| 520 | 9.7 |
| 527 | 10.7 |

The propane was converted to a mixture of 2-chloro and 1-chloropropane with the ratio of 2-chloro to 1-chloro being about 1.6. At the lower temperatures most of the propyl chlorides were recoverable. At the higher temperatures most of the propyl chlorides were cracked to propylene and hydrogen chloride.

*Example 5b*

With the same reactor at a temperature of 525° C. and a feed of .006 mol/min. of $CCl_4$ and .0146 mol/min.

propane, 22.3 mol percent of the CCl₄ was converted to chloroform. No perchlorethylene was found in any of the reaction products of propane with carbon tetrachloride.

Obviously, many modifications and variations may be made without departing from the spirit and scope of this invention, and therefore only such limitations should be imposed as are indicated in the appended claims.

We claim:

1. A process comprising reacting carbon tetrachloride and a hydrogen source which is a hydrocarbon compound selected from the class consisting of chlorinated alkanes having one to three carbon atoms and non-chlorinated alkanes having two to three carbon atoms at a temperature between about 400° C. and about 650° C. for a period of between about 0.1 and about 20 seconds to yield chloroform, said reaction taking place in a smooth walled reaction zone and in the absence of an added surface material or catalyst.

2. A process comprising reacting carbon tetrachloride and methyl chloride at a temperature between about 400° C. and 650° C. for a period of between about 0.1 and 20 seconds to yield chloroform and methylene chloride, said reaction taking place in a smooth walled reaction zone and in the absence of an added surface material or catalyst.

3. A process comprising reacting carbon tetrachloride and ethyl chloride at a temperature of between about 400° C. and 650° C. for a period of between about 0.1 and 20 seconds to yield chloroform and ethylidene chloride, said reaction taking place in a smooth walled reaction zone and in the absence of an added surface material or catalyst.

4. A process comprising reacting carbon tetrachloride and ethane at a temperature between about 400° C. and 650° C. for a period of between about 0.1 and 20 seconds to yield chloroform and ethyl chloride, said reaction taking place in a smooth walled reaction zone and in the absence of an added surface material or catalyst.

5. A process comprising reacting carbon tetrachloride and propane at a temperature of between about 400° C. and 650° C. for a period of between about 0.1 and 20 seconds to yield chloroform and propyl chloride, said reaction taking place in a smooth walled reaction zone and in the absence of an added surface material or catalyst.

6. A process comprising reacting carbon tetrachloride and methylene chloride at a temperature of between about 400° C. and 650° C. for a period of between about 0.1 and 20 seconds to yield chloroform, said reaction taking place in a smooth walled reaction zone and in the absence of an added surface material or catalyst.

7. A process comprising reacting carbon tetrachloride and methyl chloride at a temperature between about 490° C. and 575° C. for a period of between about 0.1 and 20 seconds to yield chloroform and methylene chloride, said reaction taking place in a smooth walled reaction zone and in the absence of an added surface material or catalyst.

8. A process comprising reacting carbon tetrachloride and ethyl chloride at a temperature of between about 480° C. and 590° C. for a period of between about 0.1 and 20 seconds to yield chloroform and ethylidene chloride, said reaction taking place in a smooth walled reaction zone and in the absence of an added surface material or catalyst.

9. A process comprising reacting carbon tetrachloride and propane at a temperature between about 475° C. and 530° C. for a period of between about 0.1 and 20 seconds to yield chloroform and propyl chlorides, said reaction taking place in a smooth walled reaction zone and in the absence of an added surface material or catalyst.

10. A process comprising reacting carbon tetrachloride and ethane at a temperature between about 450° C. and 610° C. for a period of between about 0.1 and 20 seconds to yield chloroform and ethyl chloride, said reaction taking place in a smooth walled reaction zone and in the absence of an added surface material or catalyst.

11. A process comprising reacting carbon tetrachloride and methylene chloride at a temperature of between about 450° C. and 580° C. for a period of between about 0.1 and 20 seconds to yield chloroform, said reaction taking place in a smooth walled reaction zone and in the absence of an added surface material or catalyst.

References Cited in the file of this patent

UNITED STATES PATENTS

| | | |
|---|---|---|
| 2,315,871 | Oberfell et al. | Apr. 6, 1943 |
| 2,553,799 | West et al. | May 22, 1951 |
| 2,553,800 | West et al. | May 22, 1951 |
| 2,914,572 | Amir | Nov. 24, 1959 |